(12) United States Patent
Fang et al.

(10) Patent No.: US 11,822,582 B2
(45) Date of Patent: Nov. 21, 2023

(54) METADATA CLUSTERING

(71) Applicant: SNOWFLAKE INC., Bozeman, MT (US)

(72) Inventors: Yi Fang, Kirkland, WA (US); Varun Ganesh, San Bruno, CA (US); Xinglian Liu, Redmond, WA (US); Ryan Michael Thomas Shelly, San Francisco, CA (US); Jiaqi Yan, Menlo Park, CA (US); Yizhi Zhu, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/896,446

(22) Filed: Aug. 26, 2022

(65) Prior Publication Data
US 2023/0229676 A1 Jul. 20, 2023

Related U.S. Application Data

(60) Provisional application No. 63/301,157, filed on Jan. 20, 2022.

(51) Int. Cl.
*G06F 16/28* (2019.01)
(52) U.S. Cl.
CPC .................. *G06F 16/285* (2019.01)
(58) Field of Classification Search
None
See application file for complete search history.

(56) References Cited

U.S. PATENT DOCUMENTS

| | | | |
|---|---|---|---|
| 2016/0162599 A1* | 6/2016 | Dickie | G06F 16/9017 707/769 |
| 2017/0264640 A1* | 9/2017 | Narayanaswamy | G06F 16/951 |
| 2018/0068008 A1* | 3/2018 | Cruanes | G06F 16/2282 |
| 2020/0167361 A1* | 5/2020 | Princehouse | G06F 16/24568 |
| 2022/0253441 A1* | 8/2022 | Baptist | G06F 16/2456 |
| 2022/0382751 A1* | 12/2022 | Dhuse | G06F 16/2228 |

FOREIGN PATENT DOCUMENTS

| | | | | |
|---|---|---|---|---|
| CN | 110100242 A | * | 8/2019 | ........... G06F 16/285 |
| CN | 110825794 B | * | 3/2022 | ......... G06F 16/2282 |
| KR | 20210135548 A | * | 4/2020 | |

* cited by examiner

*Primary Examiner* — Dinku W Gebresenbet
*Assistant Examiner* — Dustin D Eyers
(74) *Attorney, Agent, or Firm* — Womble Bond Dickinson (US) LLP

(57) ABSTRACT

Embodiments of the present disclosure describe systems, methods, and computer program products for improving query processing of a database. An example method can include: storing table data for a table in a plurality of micro-partitions, each micro-partition comprising a portion of the table data for the table; for each micro-partition of the plurality of micro-partitions, storing metadata for the micro-partition in at least one of a plurality of expression properties; and selecting, by a processing device, a subset of the plurality of expression properties to be grouped into a grouping expression property based at least partially on the metadata of the subset of the plurality of the expression properties. The grouping expression property may include cumulative metadata associated with the metadata of the subset of the plurality of expression properties.

15 Claims, 10 Drawing Sheets

METADATA CLUSTERING

CROSS-REFERENCE TO RELATED APPLICATIONS

This application claims the benefit of U.S. Provisional Application No. 63/301,157, filed on Jan. 20, 2022, the entire content of which is hereby incorporated by reference herein.

TECHNICAL FIELD

The present disclosure relates to databases and database management, and, more particularly, relates to storing and maintaining metadata pertaining to database data.

BACKGROUND

Databases are widely used for data storage and access in computing applications. Databases may include one or more tables that include data that can be joined, read, modified, or deleted using queries. Databases can store small or extremely large sets of data within one or more tables. This data can be accessed by various users in an organization or even be used to service public users, such as via a web site or an application programming interface (API). The large amount of data that can be contained within a database can often be useful for various types of data analytics, which involves the attempt to determine conclusions and/or predictions based on analysis of the information contained in the data. When working with large volumes of data, improvements to the efficiency of database queries can provide significant improvements to the cost and time associated with the data analysis.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
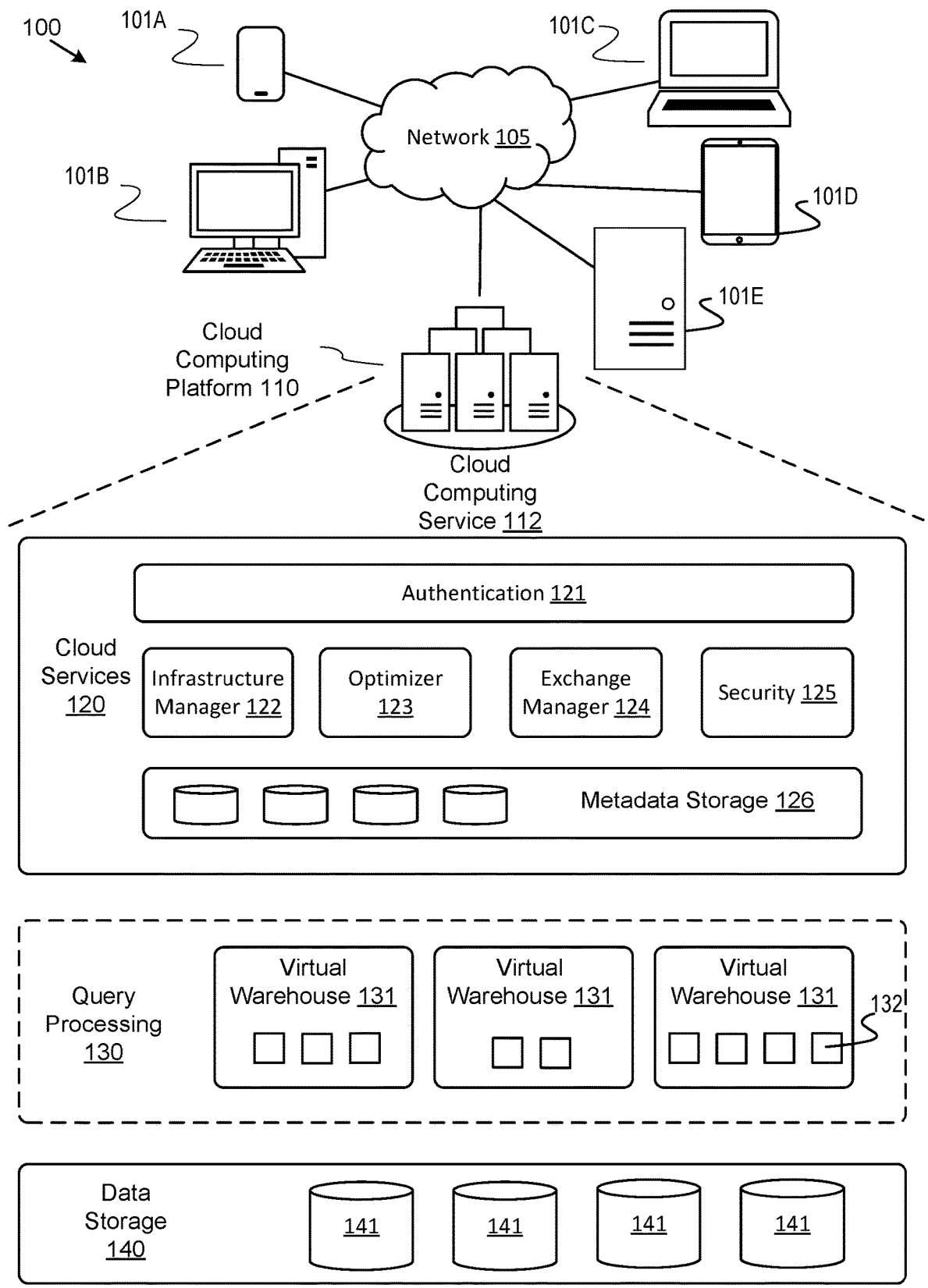
FIG. 1 is a block diagram depicting an example computing environment in which the methods disclosed herein may be implemented.

Databases are widely used for data storage and access in computing applications. A goal of database storage is to provide enormous sums of information in an organized manner so that it can be accessed, managed, and updated. In some embodiments of a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented databases, and others.

Queries can be executed against database data to find certain data within the database and respond to a question about the database data. A database query extracts data from the database and formats it into a readable form. For example, when a user wants data from a database, the user may write a query in the language required by the database. The query may request specific information from the database. For example, if the database includes information about sales transactions made by a retail store, a query may request all transactions for a certain product during a certain time frame. The query may request any pertinent information that is stored within the database. If the appropriate data can be found to respond to the query, the database has the potential to reveal complex trends and activities.

However, when a database becomes very large and includes vast sums of data, it can be very difficult to respond to a database query. Further to the above example, if the database includes a record of all sales transactions for the retail store over an extensive time period, the database may include multiple tables that each include billions of rows of information divided into hundreds or thousands of columns. If a user requests all transactions for a certain product across the entire history of the database, it can require extensive computing resources and time to scan the entire database to find each of the requested transactions.

Databases may further include metadata, or information about the database data, to aid in organizing the database and responding to queries on the database. Metadata is data information that provides information about other data. For example, metadata about an image file may include information such as the date and time the image was captured, the camera that captured the image, the camera settings when the image was captured, a file size of the image, a name of the image, and so forth. Further for example, metadata about a table in a database may include information such as the minimum value in the table, the maximum value in the table, the number of rows in the table, the number of columns in the table, the type of data stored in the table, the subject of the data stored in the table, and so forth.

Metadata can be useful for responding to a database query. For example, metadata may be helpful in performing various types of performance enhancements for queries. One such enhancement is pruning. Pruning is described, for example, in U.S. Pat. No. 10,437,780, entitled "Data pruning based on metadata," the entire contents of which are incorporated herein by reference. In some embodiments of data pruning, the predicates of a database query are examined to determine the ranges and/or types of data being queried. Metadata for the data stored in the table may then be used to rule out certain portions of the data storage from being scanned. By reducing the amount of data being scanned, the overall performance of the database will improve.

Pruning can be a very important part of query compilation in complex databases, such as those described herein. However, particularly in the context of a large database, the metadata itself can become very large and require extensive computing resources and time to just scan the metadata without scanning any of the database data. In certain implementations it can be useful to employ an organized and efficient metadata structure. With multi-level metadata, a database can effectively have metadata about groups of metadata. In such a hierarchical structure, higher level metadata may be queried before lower level metadata, which may allow for less of the metadata to be loaded.

However, even with such multi-level metadata, additional improvements may still be made. By aligning the groups of the metadata with underlying organization strategies of the database tables, such as data clustering, additional improvements to the metadata grouping may be achieved. Described herein are systems, methods, and computer program products that intelligently organize groups of metadata so as to reduce the amount of metadata that is loaded when query pruning and other types of database management are performed. Methods described herein reduce the amount of memory utilized for query compilation and allow for fewer resources to be used to perform other database tasks such as data compaction.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data. The cloud computing platform 110 may be accessed by a client 101 (e.g., a client device). Non-limiting examples of client devices include a smart phone 101A, personal computer 101B, laptop 101C, tablet computer 101D, server computer 101E, and/or another type of device that can process data.

FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI® hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of metadata, temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126. Though metadata storage 126 is illustrated as being separate from the data storage 140 in FIG. 1, this is merely for schematic purposes and is not intended to limit the present disclosure. In some embodiments, the metadata storage 126 is co-located with the data storage 140.

In one embodiment, the cloud computing service 112 can perform, or cause to be performed, data management operations on the data storage 140. In some embodiments, the data management operations may include the generation of metadata for data of the data storage 140. In some embodiments, multiple levels of metadata may be formed, one level of the metadata containing metadata values for a group of metadata in another level of the metadata. In some embodiments, the groups of the metadata may be organized at least partially based on data organization metrics of the data storage 140. For example, in some embodiments, the groups of the metadata may be organized at least partially based on a clustering key of the data storage 140.

Figure 2:
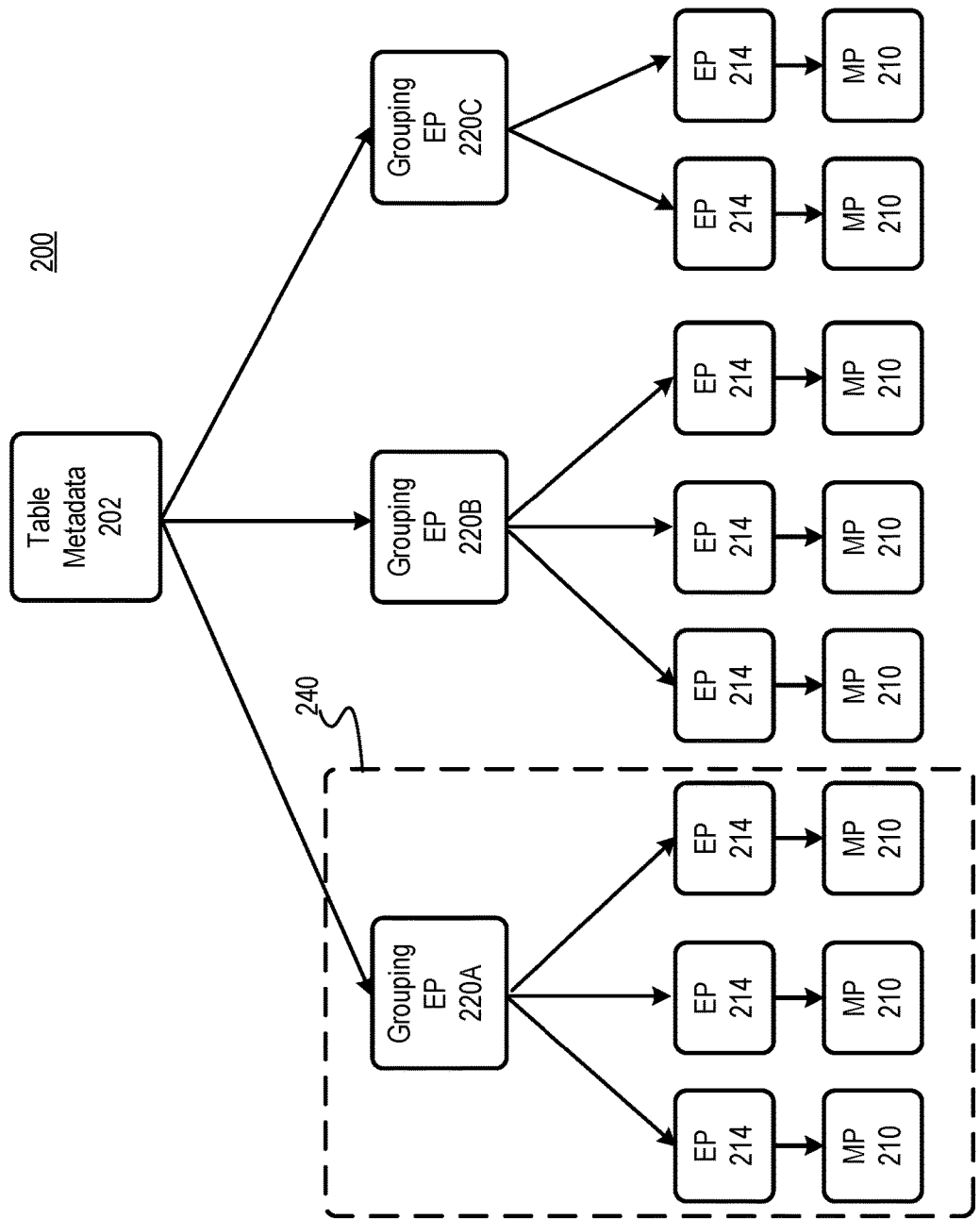
FIG. 2 is a schematic diagram of a data structure for storage of database metadata, according to some embodiments of the present disclosure.

FIG. 2 is a schematic diagram of a data structure 200 for storage of database metadata, according to some embodiments of the present disclosure. The data structure 200 includes table metadata 202 pertaining to database data stored across a table of the database. The table may be composed of multiple micro-partitions (MP) 210. Each of the multiple micro-partitions 210 may include numerous rows and columns making up cells of database data.

In some embodiments, the plurality of micro-partitions 210 of the table may be provided as immutable storage devices. When a transaction is executed on such a table, all impacted micro-partitions 210 are recreated to generate new micro-partitions 210 that reflect the modifications of the transaction. After a transaction is fully executed, any original micro-partitions 210 that were recreated may then be removed from the database. In some embodiments, a new version of the table is generated after each transaction that is executed on the table. The table may undergo many versions over a time period if the data in the table undergoes many changes, such as inserts, deletes, updates, and/or merges.

The table metadata 202 may include global information about the table of a specific version. In some embodiments, the table metadata 202 may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a data manipulation language (DML) statement such as an insert, delete, merge, and/or update command. Each time a DML statement is executed on the table, and a new table version is generated, one or more new micro-partitions 210 may be generated that reflect the DML statement.

The data structure 200 further includes file metadata 214 that includes metadata about a micro-partition 210 of the table. In some embodiments, each of the file metadata 214 may include information about at least one respective micro-partition 210 of the table. The micro-partitions 210 illustrated in FIG. 2 may include database data that is separate from the metadata storage. In some embodiments, the file metadata 214 may be stored for each column of each micro-partition 210 of the table. The file metadata 214 pertaining to a particular micro-partition 210 may be referred to as an expression property (EP) 214 and may include any suitable information about data of a portion of the table (e.g., a column) stored in the micro-partition 210, including for example, a minimum and maximum for the data stored in a portion of the database (e.g., a column), a type of data stored in the portion of the database, a subject of the data stored in the portion of the database, versioning information for the data stored in the portion of the database, file statistics for all micro-partitions 210 in the table, global cumulative expressions for columns of the table, and so forth. The terms file metadata and expression property (EP) may be used interchangeably herein. Each column of each micro-partition 210 of the table may be associated with one or more expression properties 214. As illustrated in the example embodiment shown in FIG. 2, the table metadata 202 includes expression properties 214 for each micro-partition 210. However, the embodiments of the present disclosure are not limited thereto. It should be appreciated that the table may include any number of micro-partitions 210 and any number of expression properties 214, and each micro-partition 210 may include any number of columns. The micro-partitions 210 may have the same or different columns and may have different types of columns storing different information.

The cumulative table metadata 202 may include a plurality of grouping expression properties (EP) 220A, 220B, and 220C (which may be collectively referenced herein as grouping expression properties 220). The grouping expression properties 220 may include aggregated micro-partition statistics, cumulative column properties, and so forth about a micro-partition 210 or a collection of micro-partitions 210 of the table. An expression property 214 may be stored for each column of each micro-partition 210 of the table, and a grouping expression property 220 may be stored for a collection of expression properties 214 associated with a plurality of micro-partitions 210 of the table as illustrated in FIG. 2.

The data structure 200 may include expression properties 214 for each micro-partition 210 of the table. The expression properties 214 may include a minimum/maximum data point for the corresponding micro-partition 210, a type of data stored in the corresponding micro-partition 210, a micro-partition structure of the corresponding micro-partition 210, and so forth. The expression properties 214 may be stored as part of a metadata micro-partition. A metadata micro-partition may be persisted in immutable storage and the grouping expression properties 220 may also be stored within the metadata micro-partition in immutable storage. A metadata manager may maintain all metadata micro-partitions, including metadata micro-partitions comprising the grouping expression properties 220 and/or the expression properties 214.

The cumulative table metadata 202 may include global information about all micro-partitions 210 within the applicable table. For example, the cumulative table metadata 202 may include a global minimum and global maximum for the entire table, which may include millions or even hundreds of millions of micro-partitions 210. The cumulative table metadata 202 may include any suitable information about the data stored in the table, including, for example, minimum/maximum values, null count, a summary of the database data collectively stored across the table, a type of data stored across the table, a distinct version for the data stored in the table, and so forth.

The grouping expression properties 220A-220C may include information about database data stored in an associated grouping 240 of micro-partitions 210. For example, an example grouping expression property 220A is associated with a grouping 240 of three expression properties 214 that are respectively associated with three micro-partitions 210. The example grouping expression property 220A may include information about those three different micro-partitions 210. A grouping expression property 220 may include any suitable information about the grouping 240 of the micro-partitions 210 and/or expression properties 214 with which it is associated. For example, a grouping expression property 220 may include a cumulative minimum/maximum for the collective grouping 240 of micro-partitions 210, a minimum/maximum for each of the micro-partitions 210 within the grouping 240, a cumulative null count, a null count for each of the micro-partitions 210 within the grouping 240, a cumulative summary of data collectively stored across the grouping 240 of micro-partitions 210, a summary of data stored in each of the micro-partitions 210 in the grouping 240, and so forth.

The grouping expression properties 220 illustrated in FIG. 2 provide valuable cumulative metadata pertaining to a collection of expression properties 214 and micro-partitions 210 of the database. Further, each of the expression properties 214 provide valuable information about respective ones of the micro-partitions 210 of the table.

Figure 3:
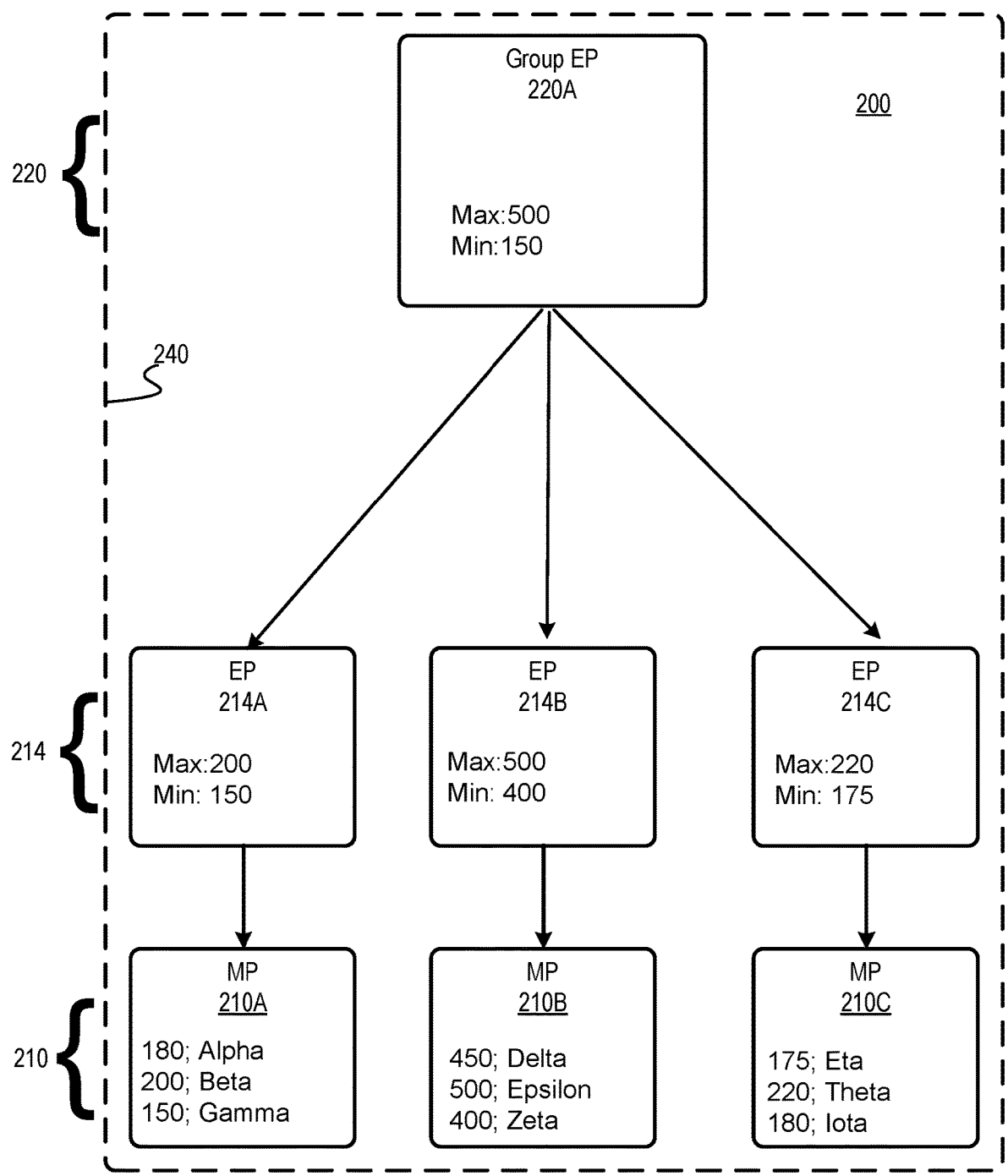
FIG. 3 illustrates an example grouping of micro-partitions, expression properties, and grouping expression properties of FIG. 2, according to some embodiments of the present disclosure.

FIG. 3 illustrates an example grouping 240 of micro-partitions 210, expression properties 214, and grouping expression properties 220 of FIG. 2, according to some embodiments of the present disclosure. The grouping 240 is an example to illustrate the grouping expression properties 220, and is not intended to limit the embodiments of the present disclosure.

Referring to FIG. 3, the data structure 200 may include grouping 240 of micro-partitions 210. More specifically, the example grouping 240 may include micro-partition 210A, micro-partition 210B, and micro-partition 210C (referred to collectively as micro-partitions 210). Each of the micro-partitions may be respectively associated with an expression property 214. For example, expression property 214A may be associated with micro-partition 210A, expression property 214B may be associated with micro-partition 210B, and expression property 214C may be associated with micro-partition 210C. A grouping expression property 220A may be associated with the micro-partition 210A, micro-partition 210B, and micro-partition 210C.

As described herein, the micro-partitions 210 may contain one or more portions of data from a database. For example, the micro-partitions 210 may contain one or more columns and/or rows from a table of the database. Example data is provided in FIG. 3 to aid in understanding. For example, micro-partition 210A contains a first column including data elements 180, 200, and 150 along with a second column including data elements "Alpha," "Beta," and "Gamma." Micro-partition 210B contains the first column including data element values 450, 500, and 400 along with the second column including data element values "Delta," "Epsilon," and "Zeta." Micro-partition 210C contains the first column including data element values 175, 220, and 180 along with the second column including data elements "Eta," "Theta," and "Iota." As previously noted, these data values are merely examples and not intended to limit the embodiments of the present disclosure.

Each of the micro-partitions 210 may be associated with at least one expression property 214. The expression property 214 may maintain, in part, metadata describing the data values of the micro-partitions 210. In FIG. 3, an example is shown for metadata regarding the max and min of data of the micro-partition 210. However, as described herein, a number of different types of metadata may be maintained in the expression property 214. For example, the metadata of the expression property 214 may include values tracking null values of the data of the micro-partition 210, length of the data, and so on.

In the example of FIG. 3, expression property 214A is associated with micro-partition 210A. The metadata of the expression property 214A tracks that the maximum (max) of the data of the first column of the micro-partition 210A is 200 and the minimum (min) of the data of the first column of the micro-partition 210A is 150. Expression property 214B is associated with micro-partition 210B. The metadata of the expression property 214B tracks that the maximum (max) of the data of the first column of the micro-partition 210B is 500 and the minimum (min) of the data of the first column of the micro-partition 210B is 400. Expression property 214C is associated with micro-partition 210C. The metadata of the expression property 214C tracks that the maximum (max) of the data of the first column of the micro-partition 210C is 220 and the minimum (min) of the data of the first column of the micro-partition 210C is 175. The minimum and maximum data values maintained by the respective expression properties 214 represents a smallest value and a largest value, respectively, of the data for a particular column (e.g., the first column) for a respective micro-partition 210.

The expression properties 214A, 214B, and 214C may be associated with a grouping expression property 220. In the example of FIG. 3, expression properties 214A, 214B, and 214C are each associated with grouping expression property 220A. The metadata of the grouping expression property 220A tracks that the maximum (max) of the metadata of the first column tracked by the expression properties 214A, 214B, and 214C is 500 and the minimum (min) of the metadata of the first column tracked by the expression properties 214A, 214B, and 214C is 150. The minimum and maximum data values maintained by the grouping expression properties 220 represents a smallest value and a largest value, respectively, of the metadata for a particular column (e.g., the first column) for the expression properties 214 within the grouping 240.

The use of the expression properties 214 and the grouping expression properties 220 may increase the efficiency of query processing. For example, as part of data pruning for a query, it may be determined that a particular query utilizes a predicate that restricts data values returned to those in which the first column has a value less than 100. By reviewing the min and max of the grouping expression property 220, it can be determined that none of the expression properties 214 associated with the grouping expression property 220 have a data value in the first column that would match this query. Subsequently, the micro-partitions 210 of the grouping 240 may be skipped in a scan of data to find values that should be returned for the query.

As another example, as part of data pruning for a query, it may be determined that a particular query utilizes a predicate that restricts data values returned to those in which the first column has a value less than 200. By reviewing the min and max of the grouping expression property 220, it can be determined that at least one of the expression properties 214 associated with the grouping expression property 220 has a data value in the first column that would match this query. Responsive to this determination, the metadata for the expression properties 214 associated with the grouping expression property 220 may be examined. From that examination, it can be determined that the expression properties 214A and 214C have min and max values indicating that their respective micro-partitions 210 contain data that would match this query. Subsequently, the micro-partition 210B of the grouping 240 may be skipped and the micro-partitions 210A and 210C may be examined in a scan of data to find values that should be returned for the query.

The data structure 200 shown in FIGS. 2 and 3 increases efficiency when responding to database queries. A database query may request any collection of data from the database and may be used to create advanced analyses and metrics about the database data. Some queries, particularly for a very large database, can be extremely costly to run both in time and computing resources. When it is necessary to scan metadata and/or database data for each file or micro-partition of each table of a database, it can take many minutes or even hours to respond to a query. In certain implementations this may not be an acceptable use of computing resources. The data structure 200 disclosed herein provides increased metadata granularity and enables multi-level pruning of database data.

During compilation and optimization of a query on the database, a processing device may scan the cumulative table metadata 202 to determine if the table includes information pertaining to the query. In response to determining, based on the cumulative table metadata 202, that the table includes information pertaining to the query, the processing device may scan each of the grouping expression properties 220 to determine which grouping of micro-partitions 210 of the table include information pertaining to the query. In response to determining, based on a first grouping expression property 220, that a first grouping 240 of micro-partitions 210 does not include information pertaining to the query, the processing device may discontinue database scanning of that first grouping 240 of micro-partitions 210. In response to determining, based on a second grouping expression property 220, that a second grouping 240 of micro-partitions 210 includes information pertaining to the query, the processing device may proceed to scan expression properties 214 for that second grouping 240 of micro-partitions 210. The processing device may efficiently determine which micro-partitions 210 include pertinent data and which columns of which micro-partitions 210 include pertinent data. The processing device may proceed to scan only the relevant column(s) and micro-partition(s) 210 that include information relevant to a database query. This provides a cost efficient means for responding to a database query by way of multi-level pruning based on multi-level table metadata.

Further to increase the cost efficiency of database queries, a resource manager (e.g., cloud services 120 of FIG. 1) may store the cumulative table metadata 202 in a cache for faster retrieval. Metadata for the database may be stored in a metadata store separate and independent of a plurality of shared storage devices collectively storing database data. In some embodiments, metadata for the database may be stored within the plurality of shared storage devices collectively storing database data. In some embodiments, metadata may be stored in metadata-specific micro-partitions that do not include database data, and/or may be stored within micro-partitions that also include database data. The metadata may be stored across disk storage, such as the plurality of shared storage devices, and it may also be stored in cache within the resource manager.

Figure 4:
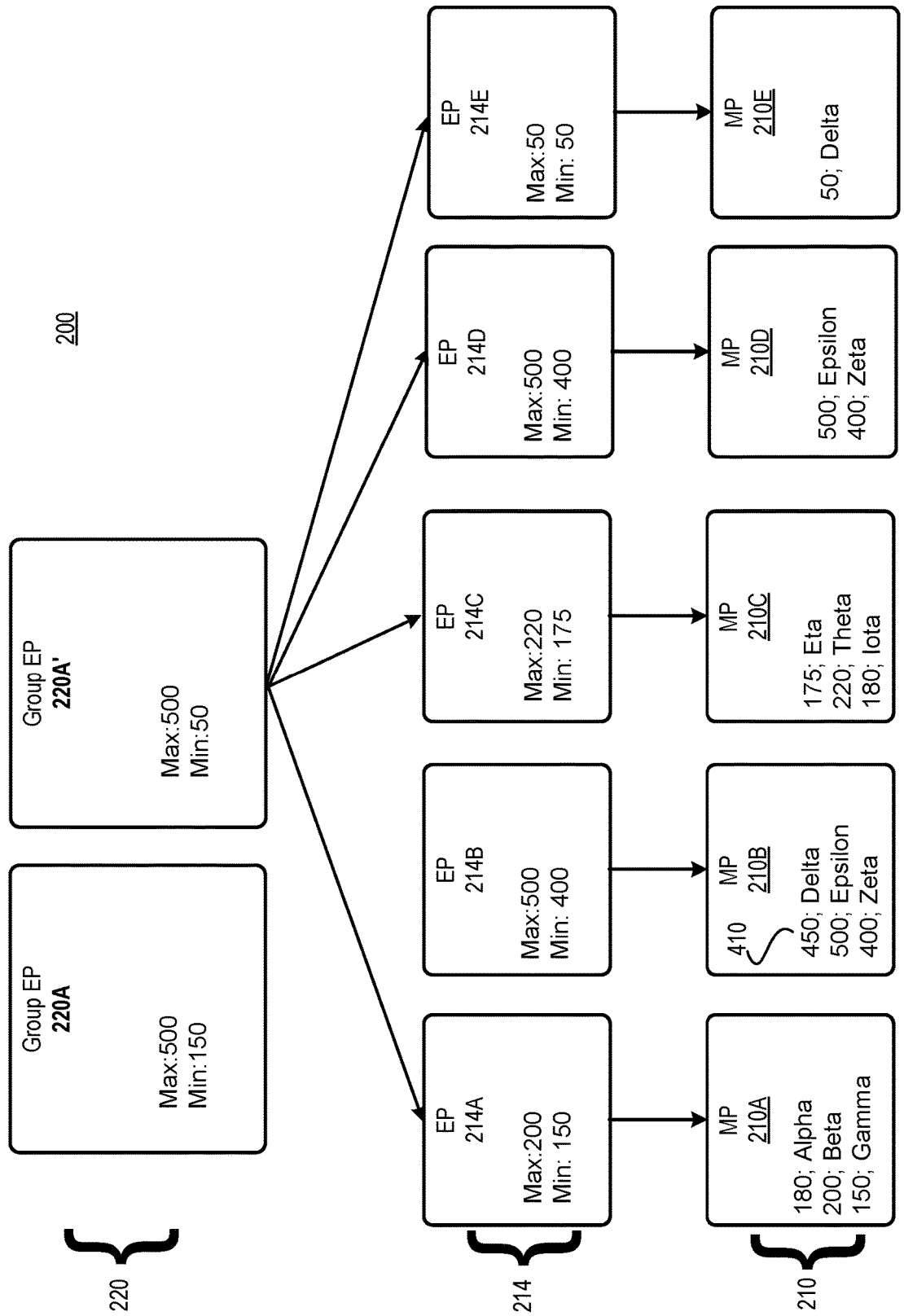
FIG. 4 illustrates an example modification of a micro-partition, according to some embodiments of the present disclosure.

Though the use of multi-level metadata may provide benefits, it may still introduce challenges. For example, the generation of the groupings 240 may be made in a naive manner. For example, as new micro-partitions 210 are created (along with new expression properties 214), they may be grouped based on time of creation and/or registration. This may result in configurations that are suboptimal. FIG. 4 illustrates an example modification of a micro-partition 210, according to some embodiments of the present disclosure.

The example of FIG. 4 illustrates a scenario in which the expression properties 214 and the micro-partitions 210 are stored in immutable storage. In such a scenario, a modification to data within a micro-partition 210 may result in the formation of a new micro-partition 210 rather than an in-situ modification of the current micro-partition 210 containing the data. Though the example of FIG. 4 concerns immutable storage, the embodiments of the present disclosure are not limited to such a configuration.

In the example of FIG. 4, it is assumed that a data modification is performed to the data of micro-partition 210B (e.g., as a result of a DML transaction). For example, the data of the first column that previously had a value of 450 (illustrated by reference number 410) may be changed to have a value of 50. In such a scenario, new micro-partitions 210D and 210E may be created.

For example, micro-partition 210D contains a first column including data element values 500 and 400 along with a second column including data elements "Epsilon" and "Zeta." The data of micro-partition 210D may be the data from the original micro-partition 210B that has been moved, e.g., due to the immutability of micro-partition 210B. Micro-partition 210E contains the first column including data element 50 along with the second column including the data element "Delta." The data of micro-partition 210E may be the data from the original micro-partition 210B that has been updated, e.g., due to the immutability of micro-partition 210B. In some embodiments, two new micro-partitions 210D, 210E may be created rather than forming a single new micro-partition 210 for a number of potential reasons. For example, as will be discussed further herein, the data of the micro-partitions 210 may be organized based on clustering keys associated with the data.

Each of the new micro-partitions 210D, 210E will each be associated with an expression property 214. For example, expression property 214D is associated with micro-partition 210D. The metadata of the expression property 214D tracks that the maximum (max) of the data of the first column of the micro-partition 210D is 500 and the minimum (min) of the data of the first column of the micro-partition 210D is 400. Expression property 214E is associated with micro-partition 210E. The metadata of the expression property 214E tracks that the maximum (max) of the data of the first column as well as the minimum (min) of the data of the first column of the micro-partition 210E is 50.

The expression properties 214D, 214E may also be associated with grouping expression property 220A'. Due to the update of the data that resulted in the formation of the new micro-partition 210E, the minimum (min) of the metadata tracked by the expression property 214E may now be 50. The grouping expression property 220A' may either be an updated form of the previous grouping expression property 220A, or may be a new grouping expression property 220A' formed due to the grouping expression property 220A being formed in immutable storage. The updated grouping expression property 220A' may include expression properties 214A, 214C, 214D, and 214E.

The update of the minimum value of the grouping expression property 220A' to 50 now means that the minimum and maximum values of the grouping expression property 220A' cover a much larger range. As a result of covering a much larger range, the efficiency of the pruning may be impacted because the pruning may not be able to deselect as many expression properties 214 for scanning. For example, in the prior-discussed scenario in which a predicate of a query selected data based on the data of the first column being less than 100, pruning would allow all of the micro-partitions to be skipped in the example of FIG. 3. With this update to the data, the same query will now require all of the expression properties 214 to be scanned, despite the fact that only one of the micro-partitions, micro-partition 210E, meets this predicate.

Embodiments of the present disclosure arise, at least in part, from a recognition that it may be useful to utilize additional criteria in the selection of expression properties 214 for grouping expression properties 220. In some embodiments, the expression properties 214 of a grouping expression property 220 may be selected based on both a time of creation and/or registration as well as other factors. For example, the expression properties 214 of a grouping expression property 220 may be selected based on values of the metadata of the expression properties 214. In some embodiments, the expression properties 214 of a grouping expression property 220 may be selected based on a clustering key of the micro-partitions 210.

Figure 5:
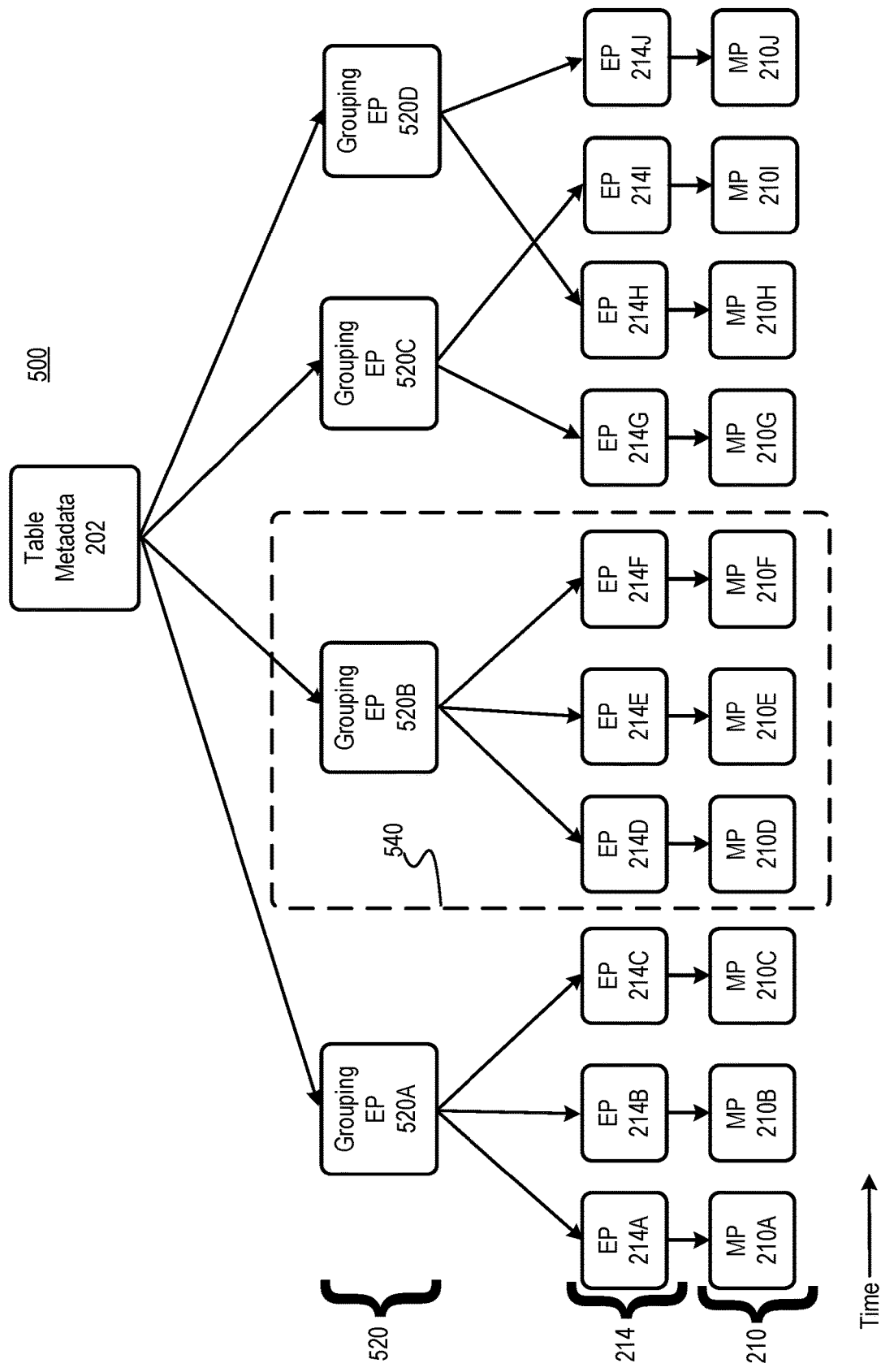
FIG. 5 is a schematic diagram of a data structure for storage of database metadata, according to some embodiments of the present disclosure.

FIG. 5 is a schematic diagram of a data structure 500 for storage of database metadata, according to some embodiments of the present disclosure. FIG. 5 differs from FIG. 3 in that additional criteria may be used for forming the grouping expression properties 520. A description of elements of FIG. 5 that are common with FIG. 3 will be omitted for brevity.

The data structure 500 of FIG. 5 includes micro-partitions 210 (e.g., micro-partitions 210A through 210J) and expression properties 214 (e.g., expression properties 214A through 214J). The data structure 500 may also include grouping expression properties 520 (e.g., grouping expression properties 520A, 520B, 520C, and 520D). The grouping expression properties 520A-520D may include information about database data stored in an associated grouping 540 of micro-partitions 210. (One example grouping 540 is illustrated in FIG. 5 to aid in the discussion.) A grouping expression property 520 may include any suitable information about the grouping 540 of the micro-partitions 210 with which it is associated. For example, a grouping expression property 520 may include a cumulative minimum/maximum for the collective grouping 540 of micro-partitions 210, a minimum/maximum for each of the micro-partitions 210 within the grouping 540, a cumulative null count, a null count for each of the micro-partitions 210 within the grouping 540, a cumulative summary of data collectively stored across the grouping 540 of micro-partitions 210, a summary of data stored in each of the micro-partitions 210 in the grouping 540, and so forth. The grouping expression property 520 may include cumulative information for all micro-partitions 210 within the grouping 540 of micro-partitions 210 that is associated with the grouping expression property 520.

In FIG. 5, a time axis has been added to the bottom of the figure. The time axis is intended to illustrate that the various micro-partitions 210 and associated expression properties 214 may be sequentially created, from left to right, as time passes. This is merely a schematic example to show one variable which may be used to provide input into the selection of micro-partitions 210 and associated expression properties 214 for a grouping expression property 520, and is not intended to limit the embodiments of the present disclosure.

Referring to FIG. 5, micro-partitions 210A to 210C may be created in order, and may be added, along with their associated expression properties 214, into grouping expression property 520A. Similarly, micro-partitions 210D to 210F may be created in order, and may be added, along with their associated expression properties 214, into grouping expression property 520B.

With the creation of micro-partitions 210G to 210J, additional criteria may be used to select to which grouping expression the micro-partition 210 is assigned. For example, micro-partition 210G may be formed (e.g., in immutable storage). Expression property 214G may be formed and associated with micro-partition 210G. The metadata of the expression property 214G may be loaded based on the data contained in the micro-partition 210G, as described herein. The micro-partition 210G, as well as the associated expression property 214G may be added to grouping expression property 520C.

Next, micro-partition 210H may be created. Expression property 214H may be formed and associated with micro-partition 210H. The metadata of the expression property 214H may be loaded based on the data contained in the micro-partition 210H, as described herein. Next, it may be determined whether the micro-partition 210H, and the associated expression property 214H should be included in the grouping expression property 520C.

A decision on whether the micro-partition 210H and the associated expression property 214H should be included in the grouping expression property 520C may be based, in part, on the metadata of the expression property 214H. In some embodiments, the subsets of the expression properties 214 that are included in respective ones of the grouping expression properties 520 may be selected to reduce and/or minimize overlap in the metadata of different grouping expression properties 520. For numerical data, overlap of the metadata may include scenarios in which an upper level (e.g., a maximum value) of one set of metadata of an expression property 214 is greater than a lower level (e.g., a minimum value) of another set of metadata of an expression property 214. In some embodiments, the data structure 500 may attempt to keep the metadata tracked (e.g., within the minimum and maximum values) by a first grouping expression property 520 distinct from metadata tracked by a second grouping expression property 520.

Though a complete lack of overlap between grouping expression properties 520 may be a goal, the embodiments of the present disclosure are not limited to such a configuration. In some embodiments, the subsets of expression properties 214 that are assigned to respective ones of a plurality of grouping expression properties 520 may be made to reduce the overlap. For example, the metadata covered by two different grouping expression properties 520 may overlap, but may overlap for only a small or reduced portion of the total range of the metadata. For example, a first grouping expression property 520 may include metadata having a maximum value of 500 and a minimum value of 450, while another grouping expression property 520 may include metadata having a maximum value of 600 and a minimum value of 490. While these two metadata ranges overlap, they overlap for only a small portion (twenty percent or less) of either of the two metadata ranges.

Referring back to FIG. 5, it may be determined that the metadata tracked by new micro-partition 210H and the associated expression property 214H would cause an overlap in metadata coverage in the grouping expression properties 520 of the data structure 500. It may be determined that, rather than generating such an overlap, a new grouping expression property 520D may be generated, and micro-partition 210H, as well as the associated expression property 214H may be added to grouping expression property 520D.

Next, micro-partition 210I may be formed (e.g., in immutable storage). Expression property 214I may be formed and associated with micro-partition 210I. The metadata of the expression property 214I may be loaded based on the data contained in the micro-partition 210I, as described herein. The metadata of the associated expression property 214I may be analyzed. Based on the metadata of the expression property 214I, it may be determined that overlap between the metadata ranges of the grouping expression properties 220 would be smaller if the micro-partition 210I and the associated expression property 214I were added to grouping expression property 520C.

Next, micro-partition 210J may be formed (e.g., in immutable storage). Expression property 214J may be formed and associated with micro-partition 210J. The metadata of the expression property 214J may be loaded based on the data contained in the micro-partition 210J, as described herein. The metadata of the associated expression property 214J may be analyzed. Based on the metadata of the expression property 214J, it may be determined that overlap between the metadata ranges of the grouping expression properties 220 would be smaller if the micro-partition 210J and the associated expression property 214J were added to grouping expression property 520D.

As illustrated in FIG. 5, membership of a particular expression property 214 may be based in part on a time of creation and/or registration as well as a range of the metadata that is described by the expression property 214. In this way, overlap between various ones of the grouping expression properties 520 can be reduced. By limiting the amount of overlap between grouping expression properties 520, a pruning efficiency of the data structure 500 may be increased. One goal of the data pruning is to generate an opportunity to remove micro-partitions 210 from data scans. By reducing an overlap of groupings of data within the micro-partitions 210, it may increase the opportunities to identify distinct groupings of micro-partitions 210 that may be skipped as part of the data scan.

As described herein, the metadata included in an expression property 214 may be associated with a number of different data values of an associated micro-partition 210. As a result, the data structure 500 may be configured to reduce overlaps on one or more of a number of different metadata values of the underlying database table. In some embodiments, the metadata that is used for determining membership in a grouping expression property 220 may be based on a key of the underlying table, a particular type of the data of the table (e.g., whether the data is numeric or not), usage statistics of the data (e.g., columns that are accessed most frequently), or the like.

In some embodiments, the metadata that is used for determining membership in a grouping expression property 220 may be based on a clustering key used to organize the micro-partitions 210. A clustering key is a subset of columns in a table (or expressions on a table, such as SQL expressions) that are designated to co-locate the data in the table in the same micro-partitions 210. When specified, the clustering key may be utilized to identify portions of the table which are to be used for making decisions about which data to co-locate within a micro-partition 210. For example, if a particular column of a table is identified as a clustering key, values of the data of that particular column may be utilized to identify rows of the table that are to be co-located in a same micro-partition 210. For example, rows of the table having values of the first particular column that are relatively close to one another (e.g., within a threshold numeric distance if the first column is a numeric value) may be located in a same micro-partition 210. In some embodiments, the clustering key may be specified by the administrator, such as when a database table is created. In some embodiments, the clustering keys that are utilized to co-locate data in micro-partitions 210 may also be utilized for determining the membership in grouping expression properties 520. Clustering keys, as well as clustering in general, are discussed in U.S. Pat. No. 10,817,540, entitled "Incremental clustering maintenance of a table," the entire contents of which are incorporated herein by reference.

Figure 6:
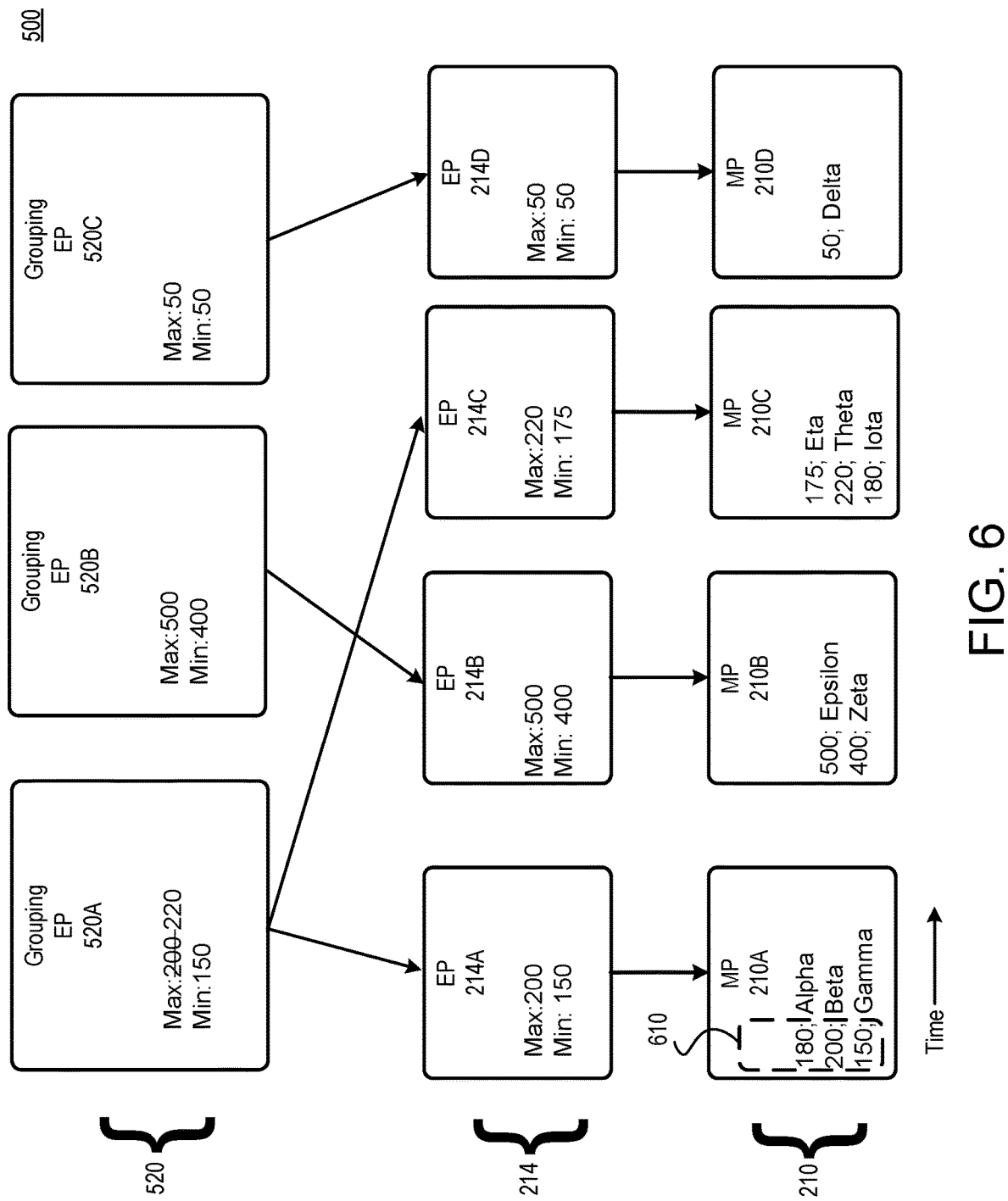
FIG. 6 is a block diagram illustrating the selection of expression properties and micro-partitions for membership in a grouping expression property, according to some embodiments of the present disclosure.

FIG. 6 is a block diagram illustrating the selection of expression properties 214 and micro-partitions 210 for membership in a grouping expression property 520, according to some embodiments of the present disclosure. FIG. 6 illustrates an example in which the micro-partitions 210 are generated in time from left to right, as illustrated by the time axis. Moreover, in the example of FIG. 6, the underlying table utilizes a clustering key 610 that is based on a first column of data in the database table. The selection scenario of FIG. 6 is merely an example, and is not intended to limit the embodiments of the present disclosure.

As described herein, the micro-partitions 210 may contain one or more portions of data from a database. For example, the micro-partitions 210 may contain one or more columns and/or rows from a table of the database. Example data is provided in FIG. 6 to aid in understanding the embodiments of the present disclosure and is not intended to limit the scope of the present disclosure.

Referring to FIG. 6, a micro-partition 210A may be created and/or registered that contains a first column including data elements 180, 200, and 150 along with a second column including data elements "Alpha," "Beta," and "Gamma." The first column of the data (e.g., values 180, 200, and 150) may be part of clustering key 610. The underlying database may have arranged the data of micro-partition 210A based on the clustering key 610 so as to co-locate the data values together in a same micro-partition 210. Expression property 214A may be created and associated with micro-partition 210A. The metadata of expression property 214A may indicate that the maximum (max) of the data of the first column of the micro-partition 210A is 200 and the minimum (min) of the data of the first column of the micro-partition 210A is 150.

The expression property 214A may be selected for membership in grouping expression property 520A. This selection may be based, in part, on the sequence in which the micro-partition 210A is created as well as the metadata of the expression property 214A. In some embodiments, the expression property 214A may be selected for membership in grouping expression property 520A based on the metadata associated with the first column of the table, as that column has been designated as the clustering key 610. The metadata of grouping expression property 520A may indicate that the maximum (max) of the data associated with the clustering key 610 for the expression properties 214 that are members of the grouping expression property 520A is 200, and the minimum (min) of the data associated with the clustering key 610 for the expression properties 214 that are members of the grouping expression property 520A is 150.

An additional micro-partition 210B may be created and/or registered that contains a first column including data element values 500 and 400 along with a second column including data elements "Epsilon" and "Zeta." The underlying database may have arranged the data of micro-partition 210B based on the data elements of the first column (e.g., the clustering key 610) so as to co-locate the data values together in a same micro-partition 210. For example, it may be recognized that the data values "400" and "500" for the first column, as the clustering key 610, are sufficiently close to indicate a preference for storing them within a same micro-partition 210. Expression property 214B may be created and associated with micro-partition 210B. The metadata of 214B may indicate that the maximum (max) of the data of the first column of the micro-partition 210B is 500 and the minimum (min) of the data of the first column of the micro-partition 210B is 400.

The expression property 214B may not be selected for membership in grouping expression property 520A. It may be determined, for example, that the range of values for the clustering key 610 in the metadata of the expression property 214B, which range from 400 to 500, would result in a range of values for the grouping expression property 520A that would be unacceptable. For example, if the expression property 214B were included in the grouping expression property 520A, the range of values for the clustering key 610 covered by the grouping expression property 520A might extend from 150 to 500. Such a large range may result in an unacceptable level of overlap for the grouping expression property 520A as compared to other grouping expression properties 520 with respect to the clustering key 610. Stated another way, it may be recognized that the inclusion of the values of the metadata associated with the clustering key 610 in the expression property 214B into the grouping expression property 520A might result in a range of the metadata that is too large to be effectively used for pruning. Such a determination may be made, for example, based on determining that the range of the metadata values for the clustering key 610 of the expression property 214B do not overlap with the current range of the metadata values for the clustering key 610 of the grouping expression property 520A, or that the range of the metadata values for the clustering key 610 of the expression property 214B overlap with less than a defined threshold (e.g., less than ten percent, or less than twenty percent) of the current range of the metadata values for the clustering key 610 of the grouping expression property 520A.

Accordingly, a new grouping expression property 520B may be created, and the expression property 214B may be associated with it. The metadata of grouping expression property 520B may indicate that the maximum (max) of the data associated with the clustering key 610 for the expression properties 214 that are members of the grouping expression property 520B is 500, and the minimum (min) of the data associated with the clustering key 610 for the expression properties 214 that are members of the grouping expression property 520B is 400.

In the provided example, the range of metadata of the expression property 214B was only compared to a single grouping expression property 520A, but the embodiments of the present disclosure are not limited to such a configuration. In some embodiments, the range of metadata of the expression property 214B may be compared to a plurality of existing grouping expression properties 520 to determine membership. In some embodiments, the comparison may be limited to grouping expression properties 520 that have been created/registered within a threshold duration of time from the creation/registration of the expression property 214B. Thus, the membership of the expression property 214B may be based both on the metadata of the expression property 214B that is associated with the clustering key 610 as well as the time of creation/registration of the expression property 214B. Basing the membership of the grouping expression property 520 at least partly on time of creation/registration may allow for natural grouping of data that is changed over time.

A new micro-partition 210C may be created and/or registered that contains a first column including data elements 175, 220, and 180 along with a second column including data elements "Eta," "Theta," and "Iota." The first column of the data (e.g., values 175, 220, and 180) may be part of clustering key 610. The underlying database may have arranged the data of micro-partition 210C based on the clustering key 610 so as to co-locate the data values together in a same micro-partition 210. Expression property 214C may be created and associated with micro-partition 210C. The metadata of expression property 214C may indicate that the maximum (max) of the data of the first column of the micro-partition 210C is 220 and the minimum (min) of the data of the first column of the micro-partition 210C is 175.

The expression property 214C may be selected for membership in grouping expression property 520A. This selection may be based, in part, on the sequence in which the micro-partition 210C is created as well as the metadata of the expression property 214C. It may be determined that the range of the metadata associated with the clustering key 610 of the expression property 214C is within a defined threshold of the range of metadata values currently in grouping expression property 520A. In some embodiments, the defined threshold may include values that are completely within the range, or do not exceed the range by a particular percentage (e.g., 10% or 20%). This is only an example of the defined threshold, and the embodiments of the present disclosure are not limited to such thresholds.

It may be noted that the range of the metadata for the clustering key 610 for the expression property 214C exceeds the current metadata maximum value 200. Namely, the maximum value of the clustering key metadata in expression property 214C is 220. As a result of the selection of the expression property 214C for membership in the grouping expression property 520A, the metadata of grouping expression property 520A may indicate that the maximum (max) of the data associated with the clustering key 610 for the expression properties 214 that are members of the grouping expression property 520A is 220, and the minimum (min) of the data associated with the clustering key 610 for the expression properties 214 that are members of the grouping expression property 520A is 150. In FIG. 6, it is indicated that the max value of the grouping expression property 520A is updated from 200 to 220. However, in some embodiments, such as when the grouping expression property 520A is stored in immutable storage, a new grouping expression property may be created, with updated contents.

Still referring to FIG. 6, a new micro-partition 210D may be created and/or registered that contains a first column including data element value 50 along with a second column including data elements "Delta." The first column of the data (e.g., value 50) may be part of clustering key 610. Expression property 214D may be created and associated with micro-partition 210D. The metadata of expression property 214D may indicate that the maximum (max) of the data of the first column of the micro-partition 210D is 50 and the minimum (min) of the data of the first column of the micro-partition 210D is 50.

It may be determined that the min and max values of the expression property 214D are unacceptably outside the ranges of the grouping expression property 520A and grouping expression property 520B. For example, if the expression property 214D were included in the grouping expression property 520A, the range of values for the clustering key 610 covered by the grouping expression property 520A might extend from 50 to 220. Similarly, if the expression property 214D were included in the grouping expression property 520B, the range of values for the clustering key 610 covered by the grouping expression property 520B might extend from 50 to 500. Such large ranges may result in an unacceptable level of overlap for the grouping expression properties 520A, 520B as compared to other grouping expression properties 520 with respect to the clustering key 610. Stated another way, it may be recognized that the inclusion of the values of the metadata associated with the clustering key 610 in the expression property 214D into the grouping expression properties 520A, 520B might result in a range of the metadata that is too large to be effectively used for pruning. Accordingly, a new expression grouping property 520C may be created, and the expression property 214D may be associated with it. The metadata of grouping expression property 520D may indicate that the maximum (max) of the data associated with the clustering key 610 for the expression properties 214 that are members of the grouping expression property 520D is 50, and the minimum (min) of the data associated with the clustering key 610 for the expression properties 214 that are members of the grouping expression property 520C is 50.

The example of FIG. 6 illustrates that a particular subset of the data of the micro-partitions 210, e.g., the clustering key 610, may be used as a reference point for identifying ranges of metadata in expression properties 214, and the expression properties 214 may be organized into grouping expression properties 520 based, in part, on the ranges of the clustering key 610 that are indicated by the metadata of the expression property 214.

Figure 7:
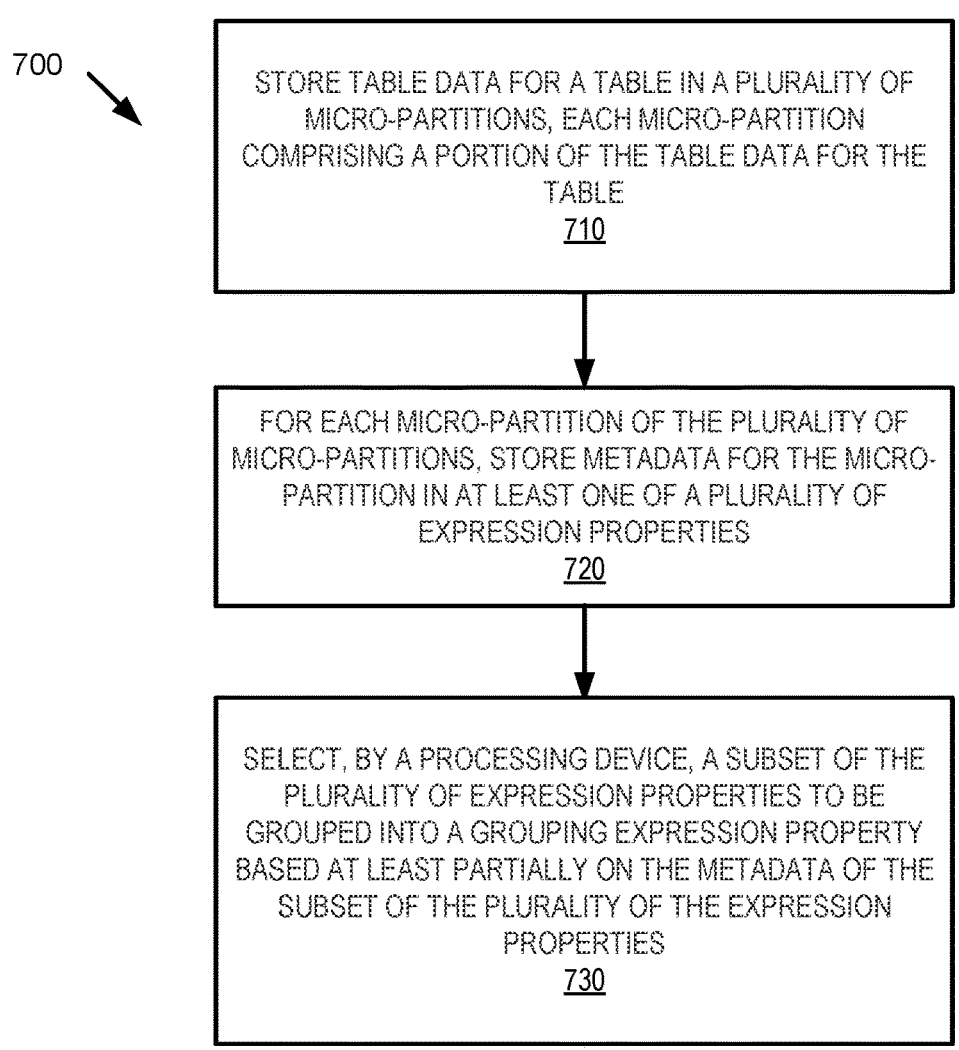
FIG. 7 is a flow diagram of one embodiment of a method for selecting expression properties to include in grouping expression properties, according to some embodiments of the present disclosure.

FIG. 7 is a flow diagram of one embodiment of a method 700 for selecting expression properties 214 to include in grouping expression properties 520, according to some embodiments of the present disclosure. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof.

Method 700 may begin at operation 710, where table data for a table is stored in a plurality of micro-partitions, each micro-partition comprising a portion of the table data for the table. The micro-partitions may be similar to micro-partitions 210 described herein. In some embodiments, the micro-partitions may be stored in immutable storage of a storage device.

Operation 720 may include, for each micro-partition of the plurality of micro-partitions, storing metadata for the micro-partition in at least one of a plurality of expression properties. The expression properties may be similar to expression properties 214 described herein. In some embodiments, the expression properties may be stored in immutable storage of a storage device.

Operation 730 may include, selecting, by a processing device, a subset of the plurality of expression properties to be grouped into a grouping expression property based at least partially on the metadata of the subset of the plurality of the expression properties. The grouping expression property may include cumulative metadata associated with the metadata of the subset of the plurality of expression properties. In some embodiments, selecting the subset of the plurality of expression properties is at least partially based on a portion of the metadata of the subset of the plurality of the expression properties that is associated with a clustering key of the micro-partitions. In some embodiments, selecting the subset of the plurality of expression properties is further at least partially based on a time of creation of the micro-partition whose data is stored in the subset of the plurality of the expression properties. In some embodiments, selecting the subset of the plurality of expression properties is at least partially based on determining whether a range of the metadata of the plurality of expression properties overlaps with a range of the cumulative metadata of the grouping expression property.

In some of the examples described herein, the selection of members of a grouping expression property 520 may be determined when data is modified and/or updated within a database (e.g., in response to a DML, statement), but the embodiments of the present disclosure are not limited thereto. In some embodiments, the selection of members of a grouping expression property 520 may be performed as part of operations to improve the clustering of the database. For example, in some embodiments, the micro-partitions 210 of the database may be scanned to determine a clustering ratio of the micro-partitions 210. The clustering ratio may indicate a level of clustering for the micro-partitions 210.

A table may be defined as clustered based on a certain order-preserving function which takes data in each row as input if rows that are close in evaluation of this function are also close together in their physical ordering. The degree of clustering (clustering ratio) of a table may be determined by the proportion of rows in the physical layout of the table that satisfy such ordering criteria. Perfect clustering is achieved when for any two rows in the table that are adjacent in their physical layout, no third row can be found that yields a closer distance to both rows according to the ordering function. For tables stored as micro-partitions 210, clustering improves the probability that rows closer according to the ordering function should reside in the same micro-partition 210.

In some embodiments, the micro-partitions 210 may be scanned to determine if the clustering ratio may be improved and, if so, the micro-partitions 210 may be reorganized. If the micro-partitions 210 are stored in immutable storage, the reorganization of the micro-partitions 210 may involve the deletion and recreation of micro-partitions 210. When the micro-partitions 210 are recreated, they may be associated with expression properties 214, which may subsequently be organized into grouping expression properties 520, as described herein.

In a similar manner, the grouping expression properties 520 may be scanned to determine if the clustering ratio of the metadata range encompassed by the grouping expression property 520 may be improved. If so, the members of the grouping expression property 520 may be reorganized. The reorganization of the grouping expression property 520 may involve the movement of assignments of expression properties 214 between grouping expression properties 520. For example, an expression property 214 may be removed from one grouping expression property 520 to another grouping expression property 520. In some embodiments, selection of expression properties 214 for membership in a grouping expression property 520 may be performed in a similar matter as described herein (e.g., based on a metadata range for a data value, such as a clustering key, and/or a time of creation/registration). If the grouping expression properties 520 are stored in immutable storage, the reorganization of the grouping expression properties 520 may involve the deletion and recreation of grouping expression properties 520. In some embodiments, an improvement to the clustering quality of the micro-partitions 210 may also involve the deletion and recreation of the micro-partitions 210, which may cause the grouping expression properties 520 to be modified based on modifications to the underlying micro-partitions 210.

It may be understood that the reorganization of the grouping expression property 520 may be independent of a reorganization of the micro-partitions 210. For example, in some embodiments, a clustering ratio of the micro-partitions 210 may be at least partially independent of the clustering ratio of the grouping expression property 520. For example, in some embodiments, reorganization of the grouping expression properties 520 may be performed regardless of a clustering state of the micro-partitions 210.

In some embodiments, reorganization of the grouping expression properties 520 may be performed based on one or more clustering statistics of the grouping expression properties 520. Statistics that may be used to determine a clustering level of a grouping expression property may include: a number of micro-partitions 210 per expression property 214; an average depth and overlap per expression property 214; an average depth and overlap for the expression properties 214 of the grouping expression property 520; a maximum depth and/or overlap per expression property 214; a maximum depth and/or overlap for the expression properties 214 of the grouping expression property 520; a median depth and/or overlap per expression property 214; a median depth and/or overlap for the expression properties 214 of the grouping expression property 520; a distribution (e.g., a percentile) of the depth and/or overlap for the expression properties 214; a distribution (e.g., a percentile) of the depth and/or overlap for the expression properties 214 of the grouping expression property 520; and/or an average range of the grouping expression property 520. The depth for a micro-partition 210 may be the maximum number of intersected micro-partitions 210 at any given range. The overlap for a particular micro-partition 210 is the total number of other micro-partitions 210 intersected with the particular micro-partition 210. The above characteristics are merely examples, and not intended to limit the embodiments of the present disclosure.

Figure 8:
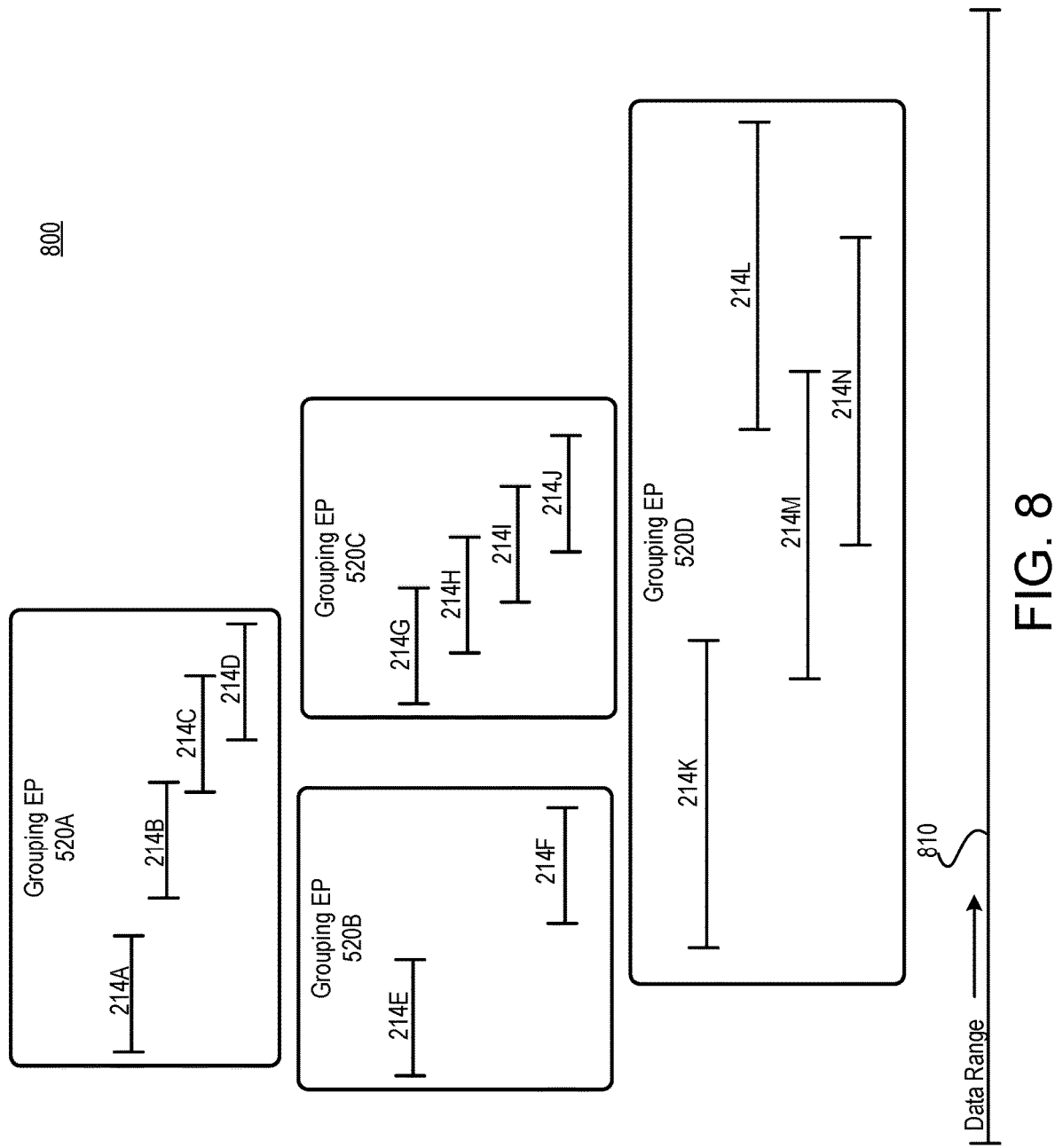
FIG. 8 is a block diagram illustrating techniques for the selection of expression properties and micro-partitions for reorganization, according to some embodiments of the present disclosure.

FIG. 8 is a block diagram illustrating techniques for the selection of expression properties and micro-partitions for reorganization, according to some embodiments of the present disclosure. A description of elements of FIG. 8 that have been previously described will be omitted for brevity. The data structures of FIG. 8 are for the purposes of an example, and are not intended to limit the embodiments of the present disclosure.

In some embodiments, the selection of the expression properties 214 and grouping expression properties 520 may be performed based on an average depth and an average overlap of the expression properties 214 and/or grouping expression properties 520. Once selected for reorganization, a given expression property 214 and/or grouping expression property 520 may be recreated and/or reorganized according to embodiments described herein. For example, a selection of expression properties 214 for membership in a grouping expression property 520 during reorganization may be performed in a similar matter as described herein (e.g., based on a metadata range for a data value, such as a clustering key, and/or a time of creation/registration).

FIG. 8 illustrates an example of a data structure 800 having a plurality of grouping expression properties 520, each having expression properties 214, as described herein. For example, the data structure 800 may include a first grouping expression property 520A, a second grouping expression property 520B, a third grouping expression property 520C, and a fourth grouping expression property 520D. The first grouping expression property 520A may have a first expression property 214A, a second expression property 214B, a third expression property 214C, and a fourth expression property 214D. The second grouping expression property 520B may have a fifth expression property 214E and a sixth expression property 214F. The third grouping expression property 520C may have a seventh expression property 214G, an eighth expression property 214H, a ninth expression property 214I, and a tenth expression property 214J. The fourth grouping expression property 520D may have an eleventh expression property 214K, a twelfth expression property 214L, a thirteenth expression property 214M, and a fourteenth expression property 214N.

In FIG. 8, each of the expression properties 214 is illustrated along a representative data range 810. The length of a line associated with each of the expression properties 214 is intended to illustrate a given range (e.g., a minimum data value to a maximum data value) for a particular expression property 214. For example, when two of the expression properties 214 are illustrated as being overlapping, that is intended to convey that the ranges covered by the expression property 214 may overlap.

In some embodiments, whether to reorganize a given grouping expression property 520 may be made based on a calculation of an average data overlap of the expression properties 214 within the grouping expression property 520, the average depth of the expression properties 214 within the grouping expression property 520, a depth of the grouping expression property 520, and/or an overlap of the grouping expression property 520. However, the embodiments of the present disclosure are not limited to such a configuration. In some embodiments, whether to reorganize a given grouping expression property 520 may be based on different factors, such as, but not limited to: a number of micro-partitions 210 per expression property 214; an average depth and overlap per expression property 214; an average depth and overlap for the expression properties 214 of the grouping expression property 520; a maximum depth and/or overlap per expression property 214; a maximum depth and/or overlap for the expression properties 214 of the grouping expression property 520; a median depth and/or overlap per expression property 214; a median depth and/or overlap for the expression properties 214 of the grouping expression property 520; a distribution (e.g., a percentile) of the depth and/or overlap for the expression properties 214; a distribution (e.g., a percentile) of the depth and/or overlap for the expression properties 214 of the grouping expression property 520; and/or an average range of the grouping expression property 520. The depth for a micro-partition 210 may be the maximum number of intersected micro-partitions 210 at any given range. The overlap for a particular micro-partition 210 is the total number of other micro-partitions 210 intersected with the particular micro-partition 210. The above examples are not intended to limit the embodiments of the present disclosure.

An overlap of a first expression property 214 may be defined to be the number of other expression properties 214 within the same grouping expression property 520 whose data ranges overlap the first expression property 214. For a given grouping expression property 520, a depth may be calculated for each expression property 214 of the grouping expression property 520, and an average overlap for the grouping expression property 520 may be calculated based on the calculated overlap for each of the member expression properties 214.

A depth of a first expression property 214 may be defined to be, at any given data point, the max number of other expression properties 214 within the grouping expression property 520 covering that same data. For a given grouping expression property 520, a depth may be calculated for each expression property 214 of the grouping expression property 520, and an average depth for the grouping expression property 520 may be calculated based on the calculated depth for each of the member expression properties 214.

Referring to FIG. 8, within the first grouping expression property 520A, the first expression property 214A may have a depth of 1 and an overlap of 0. The second expression property 214B may have a depth of 2 and an overlap of 1. The third expression property 214C may have a depth of 2 and an overlap of 2. The fourth expression property 214D may have a depth of 2 and an overlap of 1. Within the second grouping expression property 520B, both the fifth expression property 214E and the sixth expression property 214F may have a depth of 1 and an overlap of 0. Within the third grouping expression property 520C, both the seventh expression property 214G and the tenth expression property 214J may have a depth of 3 and an overlap of 2 and both the eighth expression property 214H and the ninth expression property 214I may have a depth of 3 and an overlap of 3. Within the fourth grouping expression property 520D, the eleventh expression property 214K may have a depth of 2 and an overlap of 1. The twelfth expression property 214L may have a depth of 3 and an overlap of 2. The thirteenth expression property 214M may have a depth of 3 and an overlap of 3. The fourteenth expression property 214N may have a depth of 3 and an overlap of 2.

In addition to being calculated at a level of the expression property 214, the depth and the overlap may also be calculated at the level of the grouping expression property 520 as well. In some embodiments, the range of the grouping expression property 520 may extend from the minimum value of all of the data ranges of the member expression properties 214 of the grouping expression property 520 to the maximum value of all of the data ranges of the member expression properties 214 of the grouping expression property 520. Thus, a grouping level overlap and a grouping level depth may be calculated as well. For example, the grouping level overlap for a particular grouping expression property 520 may be calculated as the number of other grouping expression properties 520 containing member expression properties 214 overlapping the particular grouping expression property 520. In addition, the grouping level depth for a particular grouping expression property 520 may be calculated as the maximum number of other grouping expression properties 520 covering a same data point within the particular grouping expression property 520.

Referring to FIG. 8, a grouping level overlap value of the first grouping expression property 520A may be calculated as 3 and the grouping level depth value of the first grouping expression property 520A may be calculated as 3. A grouping level overlap of the second grouping expression property 520B may be calculated as 2 and the grouping level depth of the second grouping expression property 520B may be calculated as 3. A grouping level overlap of the third grouping expression property 520C may be calculated as 2 and the grouping level depth of the third grouping expression property 520C may be calculated as 3. A grouping level overlap of the fourth grouping expression property 520D may be calculated as 3 and the grouping level depth of the fourth grouping expression property 520D may be calculated as 3.

In some embodiments, the depth and overlap of the expression properties 214 and the depth and overlap of the grouping expression properties 520 may be utilized to select which of the grouping expression properties 520 are to be selected for reorganization (e.g., based on a clustering key). In some embodiments, the grouping expression properties 520 may be broken into a plurality of categories based on the depth and overlap values for the grouping expression property 520 and the average depth/overlap of the grouping expression property 520.

For example, each grouping expression property may be broken into one of three categories. A first category may include grouping expression properties 520 having high (e.g., greater than a defined threshold) values for average depth and average overlap of the expression properties 214 within the grouping expression property 520. A second category may include grouping expression properties 520 having low (e.g., less than a defined threshold) values for average depth and average overlap of the expression properties 214 within the grouping expression property 520, and the grouping expression property 520 itself has high (e.g., greater than a defined threshold) values for grouping level overlap and grouping level depth. A third category may include grouping expression properties 520 having low (e.g., less than a defined threshold) values for average depth and average overlap of the expression properties 214 within the grouping expression property 520, and the grouping expression property 520 itself has low (e.g., less than a defined threshold) values for grouping level overlap and grouping level depth. Though the description herein focuses on three categories, the embodiments of the present disclosure are not limited thereto. As will be understood by those of ordinary skill in the art, different categories may be utilized without deviating from the embodiments of the present disclosure.

Figure 9:
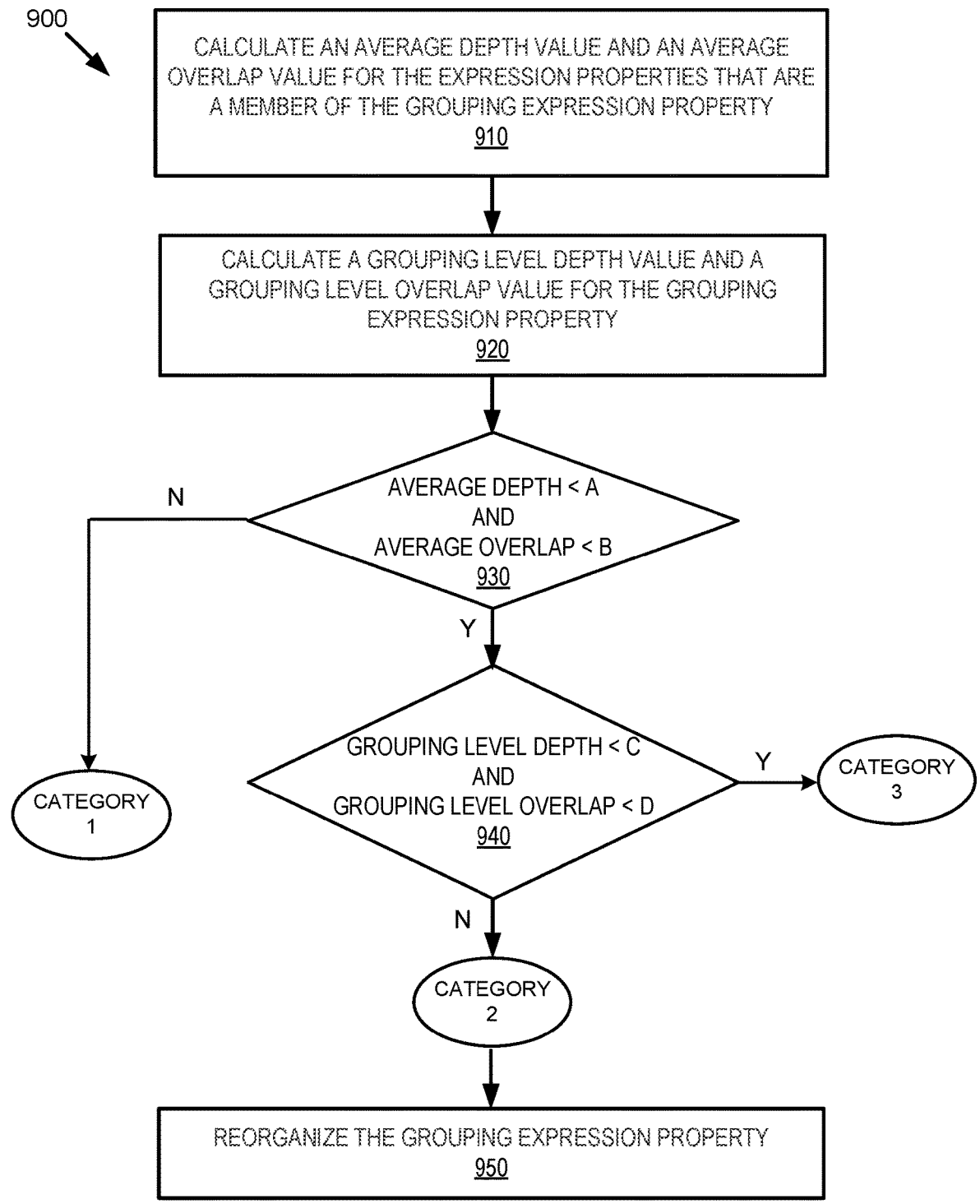
FIG. 9 is a flow diagram of one embodiment of a method for categorizing grouping expression properties for reorganization, according to some embodiments of the present disclosure.

FIG. 9 is a flow diagram of one embodiment of a method 900 for categorizing grouping expression properties 520 for reorganization, according to some embodiments of the present disclosure. In general, the method 900 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof.

Method 900 may begin at operation 910, where, for each grouping expression property 520, an average depth value and an average overlap value may be calculated for the expression properties 214 that are a member of the grouping expression property 520. The average depth value and the average overlap value of the grouping expression property 520 may be an average value, respectively, of the depth values and the overlap values for each of the expression properties 214 within the grouping expression property 520. The depth value and the overlap value may be calculated as described herein with respect to FIG. 8.

In operation 920, for each grouping expression property 520, a grouping level depth value and a grouping level overlap value may be calculated for the grouping expression property 520. The grouping level depth value and the grouping level overlap value may be calculated as described herein with respect to FIG. 8.

In operation 930, it may be determined whether the average depth value of the grouping expression property 520 is less than a first threshold (illustrated as 'A' in FIG. 9) and the average overlap value of the grouping expression property 520 is less than a second threshold (illustrated as 'B' in FIG. 9). In some embodiments, the first threshold may be 5 and the second threshold may be 10, though the embodiments of the present disclosure are not limited by this configuration. If the conditions are not met ('N' in FIG. 9), the grouping expression property 520 may be categorized as category 1. If the conditions are met ('Y' in FIG. 9), the operations may progress to operation 940.

In operation 940, it may be determined whether the grouping level depth value for the grouping expression property 520 is less than a third threshold (illustrated as 'C' in FIG. 9) and the grouping level overlap value for the grouping expression property 520 is less than a fourth threshold (illustrated as 'D' in FIG. 9). In some embodiments, the third threshold may be 20 and the fourth threshold may be 50, though the embodiments of the present disclosure are not limited by this configuration. If the conditions are met ('Y in FIG. 9), the grouping expression property 520 may be categorized as category 3. If the conditions are not met ('N' in FIG. 9), the grouping expression property 520 may be categorized as category 2.

In some embodiments, reorganization of the grouping expression properties 520 may be focused on grouping expression properties 520 in the second category, which may include grouping expression properties 520 having low (e.g., less than the first and second thresholds) values for average depth and average overlap of the expression properties 214 within the grouping expression property 520, and the grouping expression property 520 itself has high (e.g., greater or equal to the third and fourth thresholds) values for grouping level overlap and grouping level depth. In some embodiments, focusing on this category of grouping expression properties 520 may allow for a focus on the grouping expression properties 520 that may have an increased benefit from recategorization since the expression properties 214 of the grouping expression property 520 have lower values for overlap, but the grouping expression property 520 itself has a higher level of data overlap with other grouping expression properties 520.

The embodiments described herein may provide a number of technological improvements to database operations. For example, the embodiments of the present disclosure may address at least three technological challenges associated with database queries.

First, in embodiments in which the expression properties 214 are grouped into grouping expression properties 220 based solely on creation/registration time of the expression properties, pruning efficiency may be impacted, as the second level grouping expression properties 220 may have metadata ranges that are too large to effectively prune micro-partitions 210 from a data scan for a query. The embodiments described herein provide a technological improvement in that the subset of expression properties 214 grouped into a grouping expression property 520 may be more intelligently selected so as to reduce overlap between the grouping expression properties 520. As a result, pruning efficiency may increase, which results in the technological improvement of a reduction in the processing required to process a database query.

Second, in some databases, micro-partitions 210 may be clustered based, for example, on a clustering key. The clustering of micro-partitions 210 may utilize large amount of memory because clustering strategies may utilize clustering statistics that may be maintained by the expression properties 214 and/or the grouping expression properties 520. The embodiments described herein provide a technological improvement in that the amount of overlap for grouping expression properties 520 may be reduced such that micro-partitions 210 may be identified for clustering without having to load all of the grouping expression properties 520. As a result, the grouping expression properties 520 may, in some embodiments, be used to assist in clustering the micro-partitions 210. As a result, an amount of memory needed to perform micro-partition clustering may decrease, which results in the technological improvement of a reduction in the amount of memory required to maintain and configure a database.

Third, in some databases, the clustering of micro-partitions 210 may result in a large number of expression properties 214 being modified. This may cause the caching of the expression properties 214 to be inefficient, because large amounts of the metadata of the expression properties 214 may need to be reloaded. The embodiments described herein provide a technological improvement in that the operations result in expression properties 214 that are more well-grouped (e.g., in tighter groups) into grouping expression properties 520. As a result, the cache of the expression properties may become more stable, and utilize fewer reloads. As a result, an amount of cache memory needed to perform micro-partition clustering may decrease, which results in the technological improvement of a reduction in the amount of cache memory required and/or an improvement in processing speed to maintain and configure a database.

Figure 10:
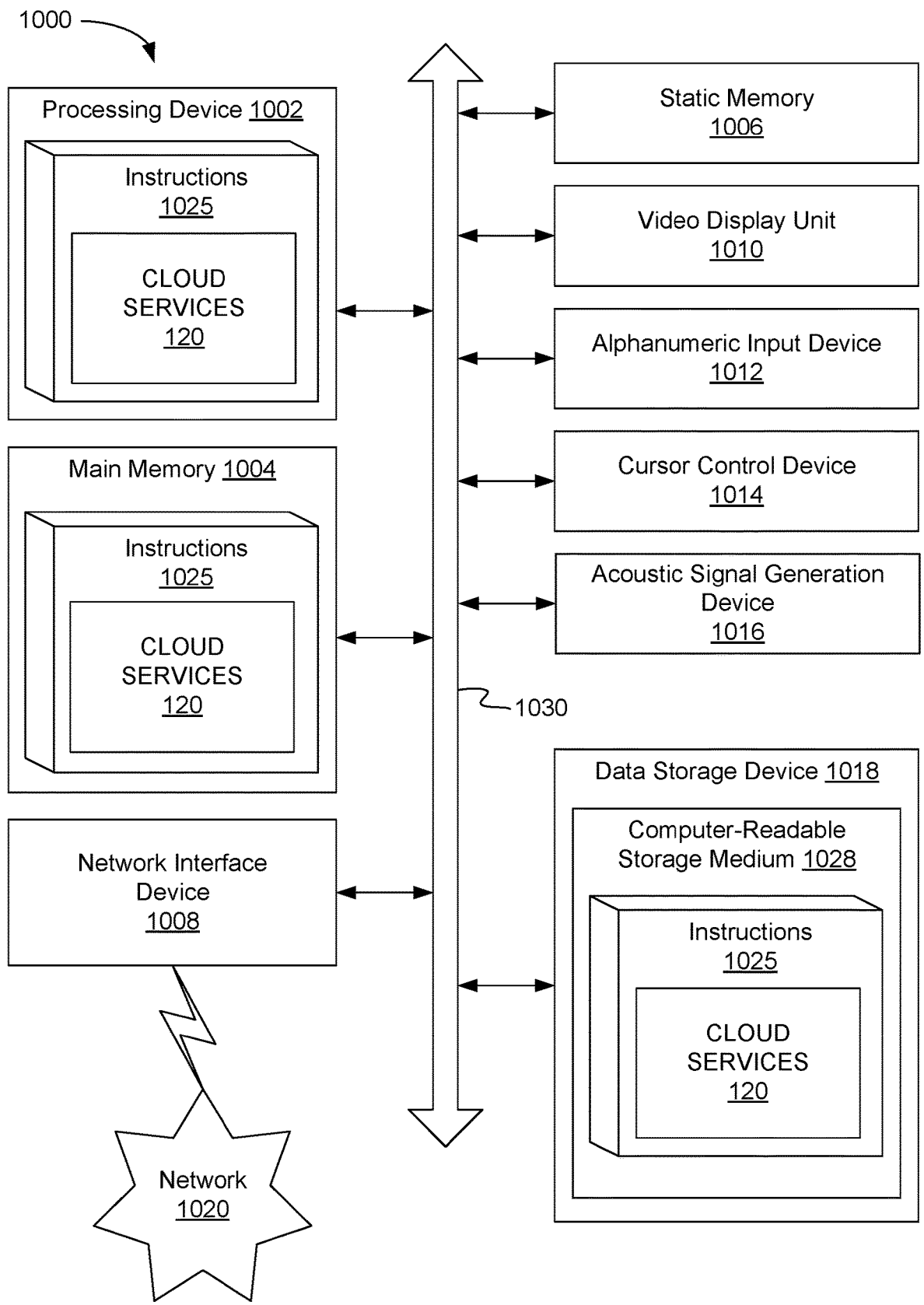
FIG. 10 is a block diagram of an example computing device that may perform one or more of the operations described herein, in accordance with some embodiments of the present disclosure.

FIG. 10 is a block diagram of an example computing device 1000 that may perform one or more of the operations described herein, in accordance with some embodiments. Computing device 1000 may be connected to other computing devices in a LAN, an intranet, an extranet, and/or the internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory) and a data storage device 1018, which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein. In one embodiment, processing device 1002 represents a processing device of cloud computing platform 110 of FIG. 1.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable (also referred to herein as machine-readable) storage medium 1028 on which may be stored one or more sets of instructions 1025, such as instructions for executing the cloud services component 120, e.g., instructions for carrying out the operations described herein, in accordance with one or more aspects of the present disclosure. Cloud services instructions 120 may also reside, completely or at least partially, within main memory 1004 and/or within processing device 1002 during execution thereof by computing device 1000, the main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "receiving," "executing," "selecting," "determining," "returning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    storing table data for a table in a plurality of micro-partitions of a storage device, each micro-partition comprising a portion of the table data for the table, wherein a first data range of a first portion of the table data of a first micro-partition of the plurality of micro-partitions overlaps a second data range of a second portion of the table data of a second micro-partition of the plurality of micro-partitions;
    for each micro-partition of the plurality of micro-partitions, storing metadata for the micro-partition in at least one of a plurality of expression properties; and
    selecting, by a processing device, a subset of the plurality of expression properties to be grouped into a grouping expression property based at least partially on the metadata of the subset of the plurality of the expression properties,
    wherein each expression property of the subset of the plurality of expression properties is associated with a different micro-partition of the plurality of micro-partitions,
    wherein the grouping expression property comprises cumulative metadata associated with the metadata of the micro-partitions associated with the subset of the plurality of expression properties and is stored in immutable storage of a storage device separately from the plurality of micro-partitions storing the table data,
    wherein the selecting the subset of the plurality of expression properties to be grouped into the grouping expression property is at least partially based on a portion of the metadata of the subset of the plurality of the expression properties that is associated with a clustering key of the micro-partitions, and
    wherein the clustering key comprises at least one of a subset of columns of the table or an expression on the table that identifies portions of the table which are to be used for making decisions about co-locating portions of the table data within a same one of the plurality of micro-partitions.

2. The method of claim 1, wherein the selecting the subset of the plurality of expression properties is further at least partially based on a time of creation of a micro-partition of the plurality of micro-partitions whose data is stored in the subset of the plurality of the expression properties.

3. The method of claim 1, further comprising:
    calculating an average depth value and an average overlap value for the subset of the plurality of expression properties of the grouping expression property;
    calculating a grouping level depth value and a grouping level overlap value for the grouping expression property; and
    reorganizing the subset of the plurality of expression properties of the grouping expression property responsive to a comparison of the average depth value, the average overlap value, the grouping level depth value, and the grouping level overlap value to respective thresholds.

4. The method of claim 1, wherein the selecting the subset of the plurality of expression properties is at least partially based on determining whether a range of the metadata of the plurality of expression properties overlaps with a range of the cumulative metadata of the grouping expression property.

5. The method of claim 1, further comprising:
creating a new micro-partition to be included in the plurality of micro-partitions of a storage device, the new micro-partition comprising data values of the table data;
creating a new expression property to be included in the plurality of expression properties and associated with the new micro-partition, the new expression property comprising metadata describing the data values of the new micro-partition; and
including the new expression property in the subset of the plurality of expression properties to be grouped into the grouping expression property at least partially based on the metadata of the new expression property.

6. A system comprising:
a memory; and
a processing device, operatively coupled to the memory, to:
store table data for a table in a plurality of micro-partitions of a storage device, each micro-partition comprising a portion of the table data for the table, wherein a first data range of a first portion of the table data of a first micro-partition of the plurality of micro-partitions overlaps a second data range of a second portion of the table data of a second micro-partition of the plurality of micro-partitions;
for each micro-partition of the plurality of micro-partitions, store metadata for the micro-partition in at least one of a plurality of expression properties; and
select a subset of the plurality of expression properties to be grouped into a grouping expression property based at least partially on the metadata of the subset of the plurality of the expression properties,
wherein each expression property of the subset of the plurality of expression properties is associated with a different micro-partition of the plurality of micro-partitions,
wherein the grouping expression property comprises cumulative metadata associated with the metadata of the micro-partitions associated with the subset of the plurality of expression properties and is stored in immutable storage of a storage device separately from the plurality of micro-partitions storing the table data,
wherein the processing device is to select the subset of the plurality of expression properties to be grouped into the grouping expression property at least partially based on a portion of the metadata of the subset of the plurality of the expression properties that is associated with a clustering key of the micro-partitions, and
wherein the clustering key comprises at least one of a subset of columns of the table or an expression on the table that identifies portions of the table which are to be used for making decisions about co-locating portions of the table data within a same one of the plurality of micro-partitions.

7. The system of claim 6, wherein the processing device is further to select the subset of the plurality of expression properties at least partially based on a time of creation of a micro-partition of the plurality of micro-partitions whose data is stored in the subset of the plurality of the expression properties.

8. The system of claim 6, wherein the processing device is further to:
calculate an average depth value and an average overlap value for the subset of the plurality of expression properties of the grouping expression property;
calculate a grouping level depth value and a grouping level overlap value for the grouping expression property; and
reorganize the subset of the plurality of expression properties of the grouping expression property responsive to a comparison of the average depth value, the average overlap value, the grouping level depth value, and the grouping level overlap value to respective thresholds.

9. The system of claim 6, wherein the processing device is further to select the subset of the plurality of expression properties at least partially based on determining whether a range of the metadata of the plurality of expression properties overlaps with a range of the cumulative metadata of the grouping expression property.

10. The system of claim 6, wherein the processing device is further to:
create a new micro-partition to be included in the plurality of micro-partitions of a storage device, the new micro-partition comprising data values of the table data;
create a new expression property to be included in the plurality of expression properties and associated with the new micro-partition, the new expression property comprising metadata describing the data values of the new micro-partition; and
include the new expression property in the subset of the plurality of expression properties to be grouped into the grouping expression property at least partially based on the metadata of the new expression property.

11. A non-transitory computer-readable storage medium including instructions that, when executed by a processing device, cause the processing device to:
store table data for a table in a plurality of micro-partitions of a storage device, each micro-partition comprising a portion of the table data for the table, wherein a first data range of a first portion of the table data of a first micro-partition of the plurality of micro-partitions overlaps a second data range of a second portion of the table data of a second micro-partition of the plurality of micro-partitions;
for each micro-partition of the plurality of micro-partitions, store metadata for the micro-partition in at least one of a plurality of expression properties; and
select, by the processing device, a subset of the plurality of expression properties to be grouped into a grouping expression property based at least partially on the metadata of the subset of the plurality of the expression properties,
wherein each expression property of the subset of the plurality of expression properties is associated with a different micro-partition of the plurality of micro-partitions,
wherein the grouping expression property comprises cumulative metadata associated with the metadata of the micro-partitions associated with the subset of the plurality of expression properties and is stored in immutable storage of a storage device separately from the plurality of micro-partitions storing the table data, wherein the processing device is to select the subset of the plurality of expression properties to be grouped into the grouping expression property at least partially based on a portion of the metadata of the subset of the plurality of the expression properties that is associated with a clustering key of the micro-partitions, and wherein the clustering key comprises at least one of a subset of columns of the table or an expression on the table that identifies portions of the table which are to be used for making decisions about co-locating portions of the table data within a same one of the plurality of micro-partitions.

12. The non-transitory computer-readable storage medium of claim 11, wherein the processing device is further to select the subset of the plurality of expression properties at least partially based on a time of creation of a micro-partition of the plurality of micro-partitions whose data is stored in the subset of the plurality of the expression properties.

13. The non-transitory computer-readable storage medium of claim 11, wherein the processing device is further to:
calculate an average depth value and an average overlap value for the subset of the plurality of expression properties of the grouping expression property;
calculate a grouping level depth value and a grouping level overlap value for the grouping expression property; and
reorganize the subset of the plurality of expression properties of the grouping expression property responsive to a comparison of the average depth value, the average overlap value, the grouping level depth value, and the grouping level overlap value to respective thresholds.

14. The non-transitory computer-readable storage medium of claim 11, wherein the processing device is further to select the subset of the plurality of expression properties at least partially based on determining whether a range of the metadata of the plurality of expression properties overlaps with a range of the cumulative metadata of the grouping expression property.

15. The non-transitory computer-readable storage medium of claim 11, wherein the processing device is further to:
create a new micro-partition to be included in the plurality of micro-partitions of a storage device, the new micro-partition comprising data values of the table data;
create a new expression property to be included in the plurality of expression properties and associated with the new micro-partition, the new expression property comprising metadata describing the data values of the new micro-partition; and
include the new expression property in the subset of the plurality of expression properties to be grouped into the grouping expression property at least partially based on the metadata of the new expression property.

* * * * *